(No Model.)

S. W. BABBITT.
BICYCLE SUSPENDER.

No. 352,508.  Patented Nov. 16, 1886.

Witnesses
Frank H. Pierpont
Eben E. Smith

Inventor
Seth William Babbitt
By his Attorney
Albert H. Walker

UNITED STATES PATENT OFFICE.

SETH WILLIAM BABBITT, OF MERIDEN, ASSIGNOR OF TWO-THIRDS TO WILBUR E. NETTLETON, OF MERIDEN, AND JOSEPH B. RENSHAW, OF HARTFORD, CONNECTICUT.

BICYCLE-SUSPENDER.

SPECIFICATION forming part of Letters Patent No. 352,508, dated November 16, 1886.

Application filed September 10, 1886. Serial No. 213,229. (No model.)

*To all whom it may concern:*

Be it known that I, SETH WILLIAM BABBITT, of Meriden, Connecticut, have invented a new and useful Bicycle-Suspender, of which the following description and claim constitute the specification, and which is illustrated by the accompanying sheet of drawings.

This invention is an apparatus adapted to suspend a bicycle by its handle-bar from the ceiling of a room, and thus to obviate all necessity of resting the bicycle upon its rubber tires—a necessity which otherwise causes those tires to become permanently flattened at various points of their circumference.

Figure 1:
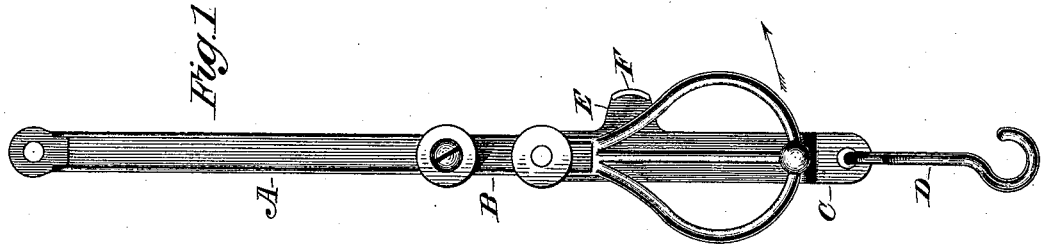
Figure 2:
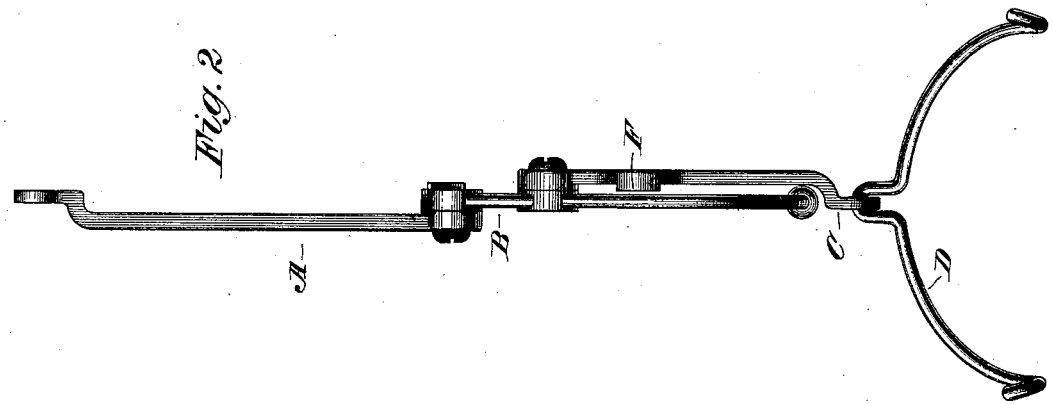
Figure 3:
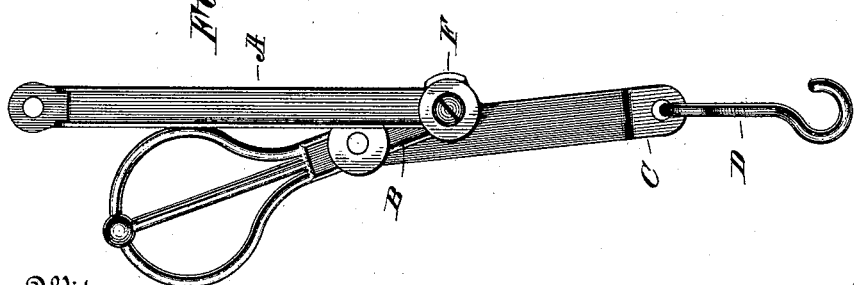

Figure 1 of the drawings is a side view, and Fig. 2 is an edge view, of the suspender in the position which it occupies when it is ready to receive the handle-bar of a bicycle upon the hooks which constitute the ends of the bail of the apparatus. Fig. 3 is a side view of the apparatus after a bicycle has been received, raised, and suspended thereby.

A is an arm, the upper end of which is suspended by a chain or otherwise from the ceiling above, and the lower end of which is pivoted to the fulcrum of the lever B. This lever is of the second order, its weight-point being pivoted to the upper end of the arm C, while the bail D is suspended from the lower end of that arm. The power end of the lever B may have any form suitable for a handle. The arm C is provided with a bracket, E, from the end of which the stop F projects at a right angle, or thereabout.

The mode of operation is as follows: The bicycle to be suspended is run under the suspender, when the latter is in the position shown in Figs. 1 and 2. Then the handle-bar is placed upon the hooks of the bail D, and the handle of the lever B is carried in the direction of the arrow in Fig. 1, through about two hundred degrees of a circle, to the position shown in Fig. 3, where it is stopped and held by the collision of the stop F with the hub, which constitutes the fulcrum end of the lever. Thus the bicycle is raised and suspended in the air, and it may afterward be lowered from that suspension by reversing the former movement of the handle of the lever B.

The stop F may be fixed to the arm A, instead of to the arm C, and in that case it will perform the described function by colliding with the hub, which constitutes the weighted point of the lever B. So, also, the bail D may be omitted and the bicycle be suspended upon hooks integral with the arm C.

I claim as my invention—

A bicycle-suspender consisting of the arm A, the lever B, and the arm C, constructed and combined substantially as described.

SETH WILLIAM BABBITT.

Witnesses:
 WM. A. PELTON,
 S. C. PORTER.